United States Patent [19]

Baines

[11] 4,168,111
[45] Sep. 18, 1979

[54] GOLFING GLASSES

[76] Inventor: Richard A. Baines, 1952 Apt. 2, S. Conway Rd., Orlando, Fla. 32806

[21] Appl. No.: 870,121

[22] Filed: Jan. 17, 1978

[51] Int. Cl.² .............................................. G02C 7/16
[52] U.S. Cl. ...................................................... 351/46
[58] Field of Search ............... 351/46, 41, 57, 110, 351/111, 42, 44, 43, 50; 350/179; D2/234; D16/65; 273/27 R, 190 R

[56] References Cited

U.S. PATENT DOCUMENTS

| 1,206,134 | 11/1916 | Otte ...................................... 351/111 |
| 2,114,658 | 4/1938 | Noffsinger ............................ D2/234 |
| 4,022,475 | 5/1977 | Todd ...................................... 351/46 |

*Primary Examiner*—John K. Corbin
*Assistant Examiner*—B. Wm. de los Reyes
*Attorney, Agent, or Firm*—Dennison, Dennison, Meserole & Pollack

[57] ABSTRACT

A golfing aid for limiting the horizontal movement of the eyes and/or head of a golfer during the swing. The aid comprises a pair of glasses having two frame mounted lenses, each being opaque except for a full height vertically elongated clear section generally centrally of each lens.

3 Claims, 3 Drawing Figures

GOLFING GLASSES

BACKGROUND OF THE INVENTION

In golfing, it is one of the basic maxims that the golfer "keep his eye on the ball". As simple as this would appear to be in theory, in actual practice it is extremely difficult to overcome the natural tendency to horizontally shift the eyes, or even the entire head, during the golf swing. This in turn, as is common knowledge, will greatly affect the accuracy of the swing and the resultant driving of the ball.

Various means, including physical restraints, have been heretofore proposed for insuring proper visual contact with the ball throughout the swing. Herein, particular concern is with golf aids in the nature of glasses having viewing ports, indicia, or the like. In this regard, attention is directed to the following three patents which constitute the most pertinent known prior art:

U.S. Pat. No. 1,637,406, Brumder, Aug. 2, 1927
U.S. Pat. No. 3,228,696, Hull, Jan. 11, 1966
U.S. Pat. No. 3,268,228, Novack, Aug. 23, 1966

Of general interest are the following two patents:

U.S. Pat. No. 1,605,418, Wittkopf, Nov. 2, 1926
U.S. Pat. No. 2,410,490, Flocker, Nov. 5, 1946

The golfing glasses of Brumder, Hull and Novack all basically operate on the same principle, that of providing a small circular or rectangular viewing port in the lenses which allow for an exact alignment of the eyes with the ball. While this, in theory, might be considered an ideal means for constantly "keeping the eyes on the ball", actual attempts to use devices as shown in these three patents makes one aware of defects inherent therein.

For example, golf clubs vary in length, an eight inch difference in length between a driver and a nine iron not being unusual in a set of clubs. Further, the placement of the ball from the golfer will vary in accordance with the club being used. Thus, it is not uncommon for the ball to be placed approximately thirteen inches further from the body when using a driver as opposed to a nine iron. Golfers also, of course, vary in height.

Considering all of the above factors, the use of a restricted viewing port or hole as in the prior art would require a change in the vertical position of the head for each different length club used. Thus, if the viewing hole were properly oriented for use with a driver, the change in the position of the head to accommodate the shorter nine iron could result in the chin actually touching the breast bone of the golfer. This in turn would make a proper backswing, and follow-through substantially impossible without the head being forced sideways.

Another problem arising from the viewing ports of the prior art is the effect one gets of peering through a keyhole which in turn greatly affects depth perception and makes it difficult to judge actual distance to the ball. Finally, the prior art viewing ports prevent a golfer from seeing both his hands and the ball without tilting his head up and down. A similar tilting of the head will be necessary for the golfer to view his feet. Both of these features are significant in that most golfers, with or without a golfing aid, will visually check their hands and feet for proper grip, alignment and stance. Along these same lines, it has been found that a substantial number of users of the glasses, in a comfortable stance, will actually look through the lower portions of the clear sections, with any covering of these portions requiring a tilting of the head and an unnatural swing.

Thus, it will be appreciated that a basic deficiency in the prior art resides in the failure to provide a vertical field of view in conjunction with a restricted horizontal field of view. In fact, the prior art seems to actually provide for a horizontal shifting of the eyes, note for example the patents to Brumder and Novack in particular.

SUMMARY OF THE INVENTION

The present invention is generally concerned with a golfing aid in the nature of a pair of glasses which enable a focussing of the eyes on the ball in a manner so as to discourage a horizontal shifting of the eyes away from the ball. More particularly, the invention proposes golf glasses which, while having the desired effect of controlling or limiting horizontal movement, provide for a vertical shifting of the eyes so as to avoid a "keyhole" effect and allow for what might be considered normal eye movement from the ball to the hands and feet.

By the same token, the provision of a vertical field of view, with significant horizontal restrictions, adapts the golfing glasses to use by individuals regardless of variations in their height, the length of the clubs used, or the positioning of the ball from the individual. Such versatility is not available in the more conventional golfing glasses incorporating single small viewing ports wherein substantial head movement is required to, for example, check the stance and hand position prior to focussing on the ball.

Basically, the golf glasses of the present invention include a pair of frame mounted lenses which incorporate full height clear vertical sections generally centrally thereof. These clear sections are bounded by opaque sections to each side thereof with the clear sections either constituting a transparent portion on the lens or an actual opening provided in the lens between the two opaque sides thereof. The mount for the lenses can be of any conventional construction including rigid frames with hinged temples, flip-up frames or clip-on frames. Also, if considered desirable, the lenses can be hinged to and depend from the bill or visor of a cap.

While the vertically elongated clear sections are generally centrally of the lenses, their spacing and positioning can very slightly as necessary to accommodate the eye spacing of an individual or any natural tendency to tilt or cock the head. A spacing of from 57–62 millimeters should suffice for most individuals. It is also to be appreciated that the width of the vertical clear section will normally be a minor portion of the overall width of the lens and will be such so as to enable a clear view of the ball in a vertical plane with the view of the ball being obstructed upon any lateral or horizontal shifting of the eyes or head.

DESCRIPTION OF THE PREFERRED EMBODIMENT

Figure 1:
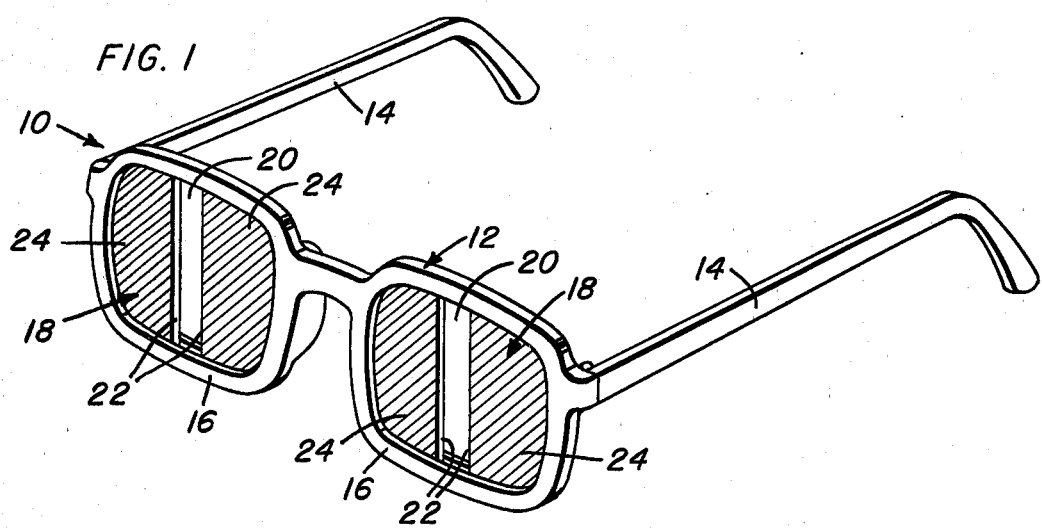
FIG. 1 is a perspective view of golf glasses constructed in accordance with the present invention and utilizing a rigid frame.

Referring now more specifically to the invention, reference 10 is used to generally designate a pair of golf glasses constructed in accordance with the present invention. The glasses 10 are to incorporate a conventional frame 12 with hingedly mounted temples 14. Positioned within each of the lens mounting rims 16 of the frame is a lens 18 constructed in accordance with the present invention. In the embodiment of FIG. 1, each of the lenses 18 includes a full height clear vertical section 20 defined by a narrow vertically elongated aperture formed between the parallel straight edges 22 of a pair of coplanar spaced opaque sections 24. The clear section or aperture 20 extends the full height of the lens mounting rim 16 and, in conjunction with the two spaced opaque sections 24, constitute the full lens 18. As previously indicated, the width of the clear sections 20 is to be such so as to provide an adequate view of the ball while at the same time controlling or limiting horizontal shifting of the eyes or head. The spacing between these clear sections 20 on the two lenses is such so as to enable a proper focussing of the eyes and will normally be between 57 and 62 millimeters.

Figure 2:
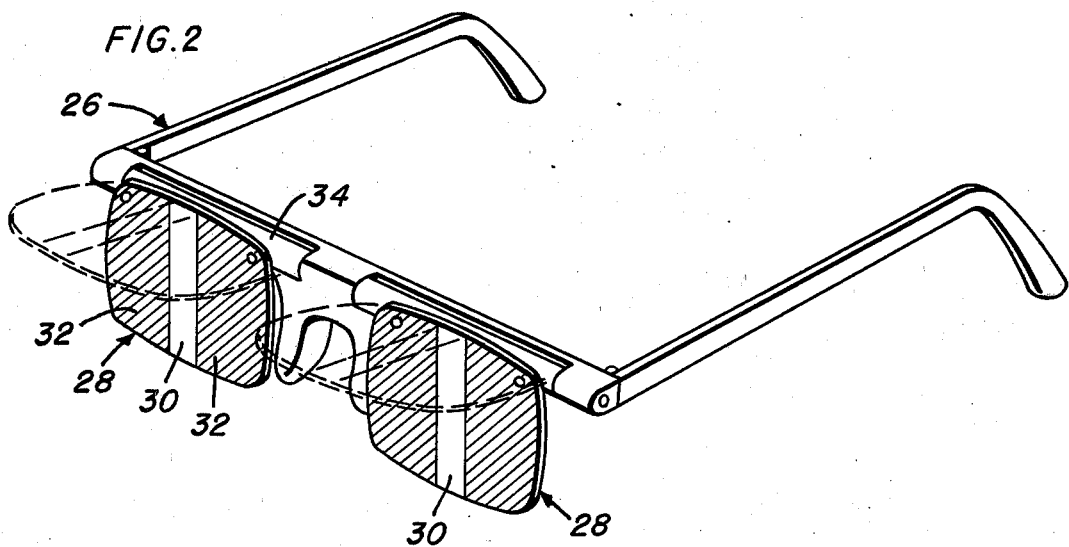
FIG. 2 is a perspective view of one contemplated variation in the golf glasses utilizing a flip-up frame.

Turning now to FIG. 2, the glasses 26 illustrated therein differ from the glasses 10 of FIG. 1 in that each lens 28 is of a one-piece construction with the clear vertically elongated central section 30 being transparent and the sections 32 to the opposed sides thereof being opaque. In addition, and through appropriate conventional hinging means 34, the lenses 28 can be of the flip-up type so as to allow for a movement of the lenses 28 to an out-of-the-way position without actually removing the glasses from the head of the wearer.

The clear sections 30, as with the clear sections 20, extend the full height of the lenses 28 and provide for the desired narrow vertically elongated field of view. Basically, the purpose of the FIG. 2 variation is to illustrate the possibility of providing the general vertically elongated clear section by either incorporating a transparent section within the material of the lens, normally plastic or glass, or by the provision of an unobstructed opening between two spaced opaque sections.

Figure 3:
FIG. 3 schematically illustrates the use of golf glasses in accordance with the present invention.

Turning now to FIG. 3, it will be noted that this figure schematically illustrates the significance of providing the narrow, vertically elongated, clear field of view. Such a view allows the wearer to easily check the position of his hands, as well as his feet, by merely a vertical shifting of his eyes in a normal manner and without an undesirable shifting of the entire head. By the same token, and as suggested in FIG. 3, the vertical field of view provided also allows for use of the golf glasses with a variety of different length clubs, again avoiding the necessity of specifically having to shift the position of the head to accommodate each change of spacing of the ball from the golfer.

While the word "opaque" has been used to describe the non-viewing sections of the lenses herein, it is to be appreciated that this word is intended to encompass any degree of darkening or obscuring of the sections which would be sufficient so as to insure no practical or useful visibility therethrough whereby the viewing will be concentrated through the provided vertical clear sections.

Further, while not specifically illustrated, it is also contemplated that other mountings can be used to position the lenses before the eyes of a golfer. For example, the lenses can clip onto a conventional pair of glasses, or can be mounted to depend from the visor of a golfing cap or the like.

I claim:

1. A golfing aid to assist in limiting horizontal movement of the eyes, said golfing aid comprising a pair of lenses, means mounting said lenses for a positioning of the lenses before the eyes of a user whereby said lenses are substantially coextensive with the user's field of view, each lens having a narrow, vertically elongated, clear section generally centrally thereof to define a vertical field of view, each vertically elongated clear section extending the full vertical height of the lens, each lens, to the opposite sides of the clear section and for the full height of the lens, being opaque whereby the field of view through the lenses is limited to the vertical field of view defined by the full height vertically elongated clear section of each lens.

2. The golfing aid of claim 1 wherein said clear section is defined by the lens being transparent for the extent of the clear section.

3. The golfing aid of claim 1 wherein said clear section is defined by an opening through said lens for the extent of the clear section.

* * * * *